March 7, 1939.　　G. G. VINCENT ET AL　　2,149,373
MELTING AND PURIFYING SULPHUR
Filed Jan. 25, 1937
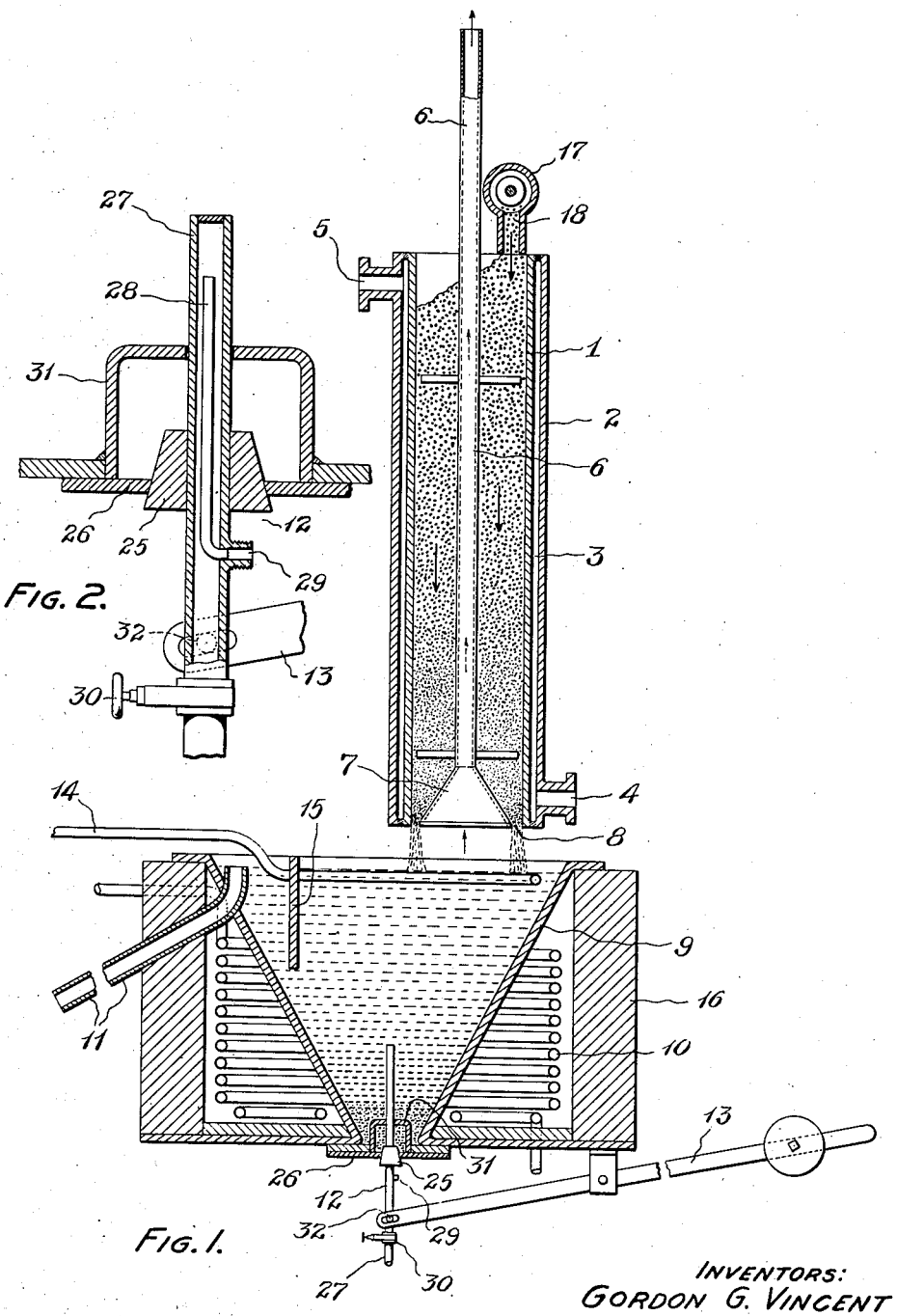
INVENTORS:
GORDON G. VINCENT
ARTHUR COOK
BY Albert B. Briggs
ATTORNEY Patented Mar. 7, 1939

2,149,373

UNITED STATES PATENT OFFICE 2,149,373

MELTING AND PURIFYING SULPHUR

Gordon G. Vincent and Arthur Cook, Hamilton, Ontario, Canada, assignors to E. I. du Pont de Nemours & Co., Inc., Wilmington, Del., a corporation of Delaware Application January 25, 1937, Serial No. 122,171

4 Claims. (Cl. 23—280)

This invention relates to a method of melting, drying and purifying sulphur and apparatus therefor, and more particularly to a method and apparatus for the melting and removing from crude sulphur, impurities which tend to accumulate in a sulphur burner or sublimer. These impurities are difficult to remove from the equipment necessitating closing down or interrupting the operation of the plant for such purpose.

The most common method in practice for the melting and purifying of sulphur is the addition of solid sulphur to pits of molten sulphur, such pits being heated by immersed steam pipes. It is necessary with this method to provide some continuous means of mixing the solid and liquid sulphur because the tendency of heated pipes immersed in solid sulphur is to melt the sulphur adjacent to the pipe, which molten sulphur then acts as an insulator, and considerably retards the rate of melting. Further, these melting pits must be of considerable volume per unit of sulphur melted, in order to place the heating coils so that the settled impurities released by melting can be removed. This necessitates a large surface area at the top of the pits exposed to the atmosphere and subjected to cooling and loss of heat. Further, the periodical removal of settled impurities from such pits is clumsy, hazardous, and costly. Again, from these large pit areas, water vapor is given off, which together with the fumes of hot molten sulphur creates a corrosive unpleasant atmosphere, injurious to both equipment and operators.

This invention has as an object, an improved method of removing the impurities from crude sulphur.

Another object of the invention is to afford a more efficient method of purifying crude sulphur by means of a continuous process thereby providing sulphur suitable for use in a sulphur burner or sublimer, without the necessity of stopping normal operation in order to "burn out" and clean the burner or sublimer.

A further object is to provide a continuous process for the production from crude sulphur, substantially irrespective of the amount of impurities contained therein, of a product of which the content of impurities such as ash, chlorine, moisture, etc., shall be maintained below that at which harmful contamination of a catalytic contact material would result.

These objects are accomplished by first heating crude sulphur in such a manner that it is substantially completely converted into the molten state without unmolten sulphur containing entrained impurities and thereafter conveying the molten material to a heated vessel wherein the impurities are allowed to settle or separate, and from which the purified sulphur is withdrawn in a molten condition.

A form of apparatus well adapted for carrying out this process of purification is shown in the accompanying drawing in which Fig. I represents a diagrammatic sectional elevation of melting and purifying apparatus, and Fig. II represents a diagrammatic sectional elevation of discharge plug 12.

Referring to the drawing, 1 represents a vertical pipe surrounded by a similar pipe 2 of larger diameter, and having an inlet 4 and an outlet 5. The pipes are co-axially arranged and are welded together at the ends leaving an annular space 3 between them. Centrally located about the axis of these pipes is a pipe 6 terminating in a hollow cone 7, the base of which is of such diameter as to leave a small annular space 8 between the lower edge of the cone and the inner side of pipe 1.

Beneath this jacketed pipe assembly there is located a settling vessel 9 in the form of an inverted cone, having a steam jacketed overflow pipe 11, and equipped with a heating coil 14, and a baffle 15. At the apex of the conical shaped vessel is an outlet which is closed by a steam heated movable outlet plug 12, actuated by lever 13. Surrounding the vessel 9 is a heating box 16, the box being equipped with heating coils 10. The arrangement of the steam heated movable outlet plug 12, Fig. II, consists of inverted taper plug 25, fitting against seat in flange 26, and heated by an external pipe 27, to the top of which steam is admitted by an internal pipe 28, from steam inlet 29, the condensate flowing out at the base thru valve 30. A guide 31 connected to the flange, holds plug 25, centrally to enable it to seat perfectly when closed. By means of a weighted lever and fulcrum connected by slot to pins 32, the plug is held in the closed position and opened by hand pressure upwards on the lever.

In carrying out the process of the invention, crude sulphur as received from the mines is fed intermittently by known means to an elevator and passes to elevated storage bin (not shown), from the base of which it feeds by gravity to a screw conveyor 17 for feeding one or a system of melters. By arranging the feed, the melter or melters are kept full and consequently operating at the highest output. The solid sulphur enters at 18, and fills the core of the vertical jacketed pipe 1, and is prevented from dropping out by the cone 7. Pipe 1 is heated to a suitable temperature by means of steam, which enters the annular space 3 by inlet 5 and the condensate removed by a trap system from 4. If hot gases or liquids are used as the heating medium these are admitted to the annular space at 4 and leave at 5.

Molten sulphur passes thru the annular space 8 to the vessel 9, any lumps or relatively large pieces being retained within the pipe 1 until melted. Moisture which is usually present in crude sulphur is liberated as the molten material enters the lower vessel 9 and passes away to the atmosphere principally thru the hollow cone 7 and the pipe 6. The molten sulphur drips continuously from the base of the melter into the vessel 9. The sulphur entering the vessel 9 is maintained in a molten condition by the passage of steam thru the heating coils 10 in the box 16, and thru coil 14, immersed just under the surface of the molten sulphur to prevent surface cooling. The flow of sulphur thru the vessel is regulated so that solid impurities, of a higher specific gravity than molten sulphur, settle substantially completely to the bottom of the cone, and impurities which float on molten sulphur are retained by means of an internal baffle 15, across the vessel, the purified product overflowing by the steam jacketed overflow pipe 11, whence it may be converted to a pumping pit and pumped to a combustion chamber or burner or a subliming chamber or it may be run to storage.

As the impurities or foreign matter accumulate in the bottom of the cone these are removed by periodically opening the outlet plug 12, and allowing such residues to drop into a suitable vessel. The residues will contain some entrained sulphur and may be disposed of in a separate vessel and the sulphur recovered as sulphur dioxide or they may be treated in any other suitable manner.

Those parts of the equipment coming in contact with molten sulphur may be constructed of steel or a resistant steel alloy, or lead protected steel resistant to the corrosion effect of molten sulphur or of weak sulphuric or hydrochloric acid which may be present in small quantities in crude sulphur The apparatus above described is well adapted to the continuous production of purified sulphur, suitable for use in a burner adapted to produce sulphurous acid gas to be used in the manufacture of sulphuric acid or for other purposes. The product is also suitable for use in a spray burner system, where molten sulphur is sprayed into a combustion chamber.

As many apparently widely different embodiments of this invention may be made without departing from the spirit and scope thereof, it is to be understood that we do not limit ourselves to the specific embodiments thereof except as defined in the appended claims.

We claim:
1. Apparatus for the purification of sulphur comprising a vertical cylindrical vessel surrounded by a jacket adapted to containing heating fluid at temperatures above the melting point of sulphur, the lower end of said cylindrical vessel being provided with a closure consisting of a hollow cone the apex of which is connected with a tube extending vertically thru said vessel and centrally located above the axis thereof, said closure being adapted to retain within said vessel unmelted sulphur but to permit the passage therefrom of molten sulphur containing unmelted impurities, and a receiving vessel located underneath said cone for receiving said molten sulphur adapted to be heated to temperatures above the melting point of sulphur and to permit of the settlement of unmelted impurities therein, the said receiving vessel having the form of an inverted cone adapted for the removal of purified molten sulphur by overflow from the top thereof and for the removal of unmelted impurities from the bottom thereof.

2. Apparatus for the continuous purification of sulphur comprising a melter for solid sulphur, the melter being provided with heating means and with an outlet for molten sulphur, and a receiving vessel into which the molten sulphur from the melter is discharged, the receiving vessel being provided with a heating means adapted to maintain the sulphur in a molten condition and having an outlet near the bottom for withdrawing impurities and having an outlet near the top for withdrawing purified molten sulphur.

3. Apparatus for the purification of sulphur comprising a vertical cylindrical vessel surrounded by a jacket adapted to containing heating fluid at temperatures above the melting point of sulphur, the lower end of said cylindrical vessel being provided with a closure consisting of a hollow cone the apex of which is connected with a tube extending vertically thru said vessel and centrally located about the axis thereof, said closure being adapted to retain within said vessel unmelted sulphur but to permit the passage therefrom of molten sulphur containing unmelted impurities, a receiving vessel in the form of an inverted cone below the said cylindrical vessel, heating means for the said receiving vessel, an outlet near the bottom of the cone for withdrawing impurities, and an outlet near the top of the cone for the removal of purified molten sulphur.

4. Apparatus for the purification of sulphur comprising a receptacle in the form of an inverted cone for holding molten sulphur, heating means around the cone for maintaining sulphur in a molten condition, heating means located within the cone and near the normal level of sulphur to prevent surface cooling and solidification of the molten sulphur, an outlet at the apex of the cone, a valve for closing said outlet and permitting withdrawal of impurities from the bottom of the receptacle, heating means for the valve, and an overflow pipe located near the normal level of molten sulphur to withdraw purified sulphur from the receptacle by overflow.

GORDON G. VINCENT.
ARTHUR COOK.